(12) United States Patent
Ko et al.

(10) Patent No.: US 11,112,645 B2
(45) Date of Patent: Sep. 7, 2021

(54) LIQUID CRYSTAL DISPLAY DEVICE HAVING INDIVIDUALLY DRIVEN BLOCKS IN LIGHT-BLOCKING PANEL

(71) Applicant: LG DISPLAY CO., LTD, Seoul (KR)

(72) Inventors: Dae-Hoon Ko, Paju-si (KR); Dong-Hyeok Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/196,868

(22) Filed: Nov. 20, 2018

(65) Prior Publication Data

US 2019/0163015 A1 May 30, 2019

(30) Foreign Application Priority Data

Nov. 24, 2017 (KR) .................. 10-2017-0158655

(51) Int. Cl.
| | |
|---|---|
| *G02F 1/13357* | (2006.01) |
| *G02F 1/1335* | (2006.01) |
| *G02F 1/1334* | (2006.01) |
| *F21V 8/00* | (2006.01) |

(52) U.S. Cl.
CPC ....... *G02F 1/133603* (2013.01); *G02B 6/005* (2013.01); *G02B 6/0031* (2013.01); *G02F 1/1334* (2013.01); *G02F 1/133553* (2013.01); *G02F 1/133606* (2013.01); *G02B 6/0055* (2013.01)

(58) Field of Classification Search
CPC combination set(s) only.
See application file for complete search history.

(56) References Cited

U.S. PATENT DOCUMENTS

| | | | | |
|---|---|---|---|---|
| 2008/0020007 | A1* | 1/2008 | Zang | G02F 1/133377 424/401 |
| 2012/0098875 | A1* | 4/2012 | Shinkai | G02B 6/0036 345/690 |
| 2012/0274867 | A1* | 11/2012 | Shinkai | G02F 1/13476 349/15 |
| 2014/0055835 | A1* | 2/2014 | Shinkai | F21V 7/00 359/251 |

FOREIGN PATENT DOCUMENTS

| | | |
|---|---|---|
| CN | 1924639 A | 3/2007 |
| CN | 102540568 A | 7/2012 |
| CN | 102768405 A | 11/2012 |
| CN | 105938280 A | 9/2016 |

\* cited by examiner

*Primary Examiner* — Lauren Nguyen
(74) *Attorney, Agent, or Firm* — Birch, Stewart, Kolasch & Birch, LLP

(57) ABSTRACT

A liquid crystal display device includes a liquid crystal panel, an optical sheet positioned below the liquid crystal panel, a light guide plate positioned below the optical sheet, a selective light-blocking panel positioned below the light guide plate, a reflector positioned below the selective light-blocking panel, and a light emitting diode (LED) assembly positioned on a side of the light guide plate, wherein the selective light-blocking panel is sectioned into a plurality of blocks, and transmits, or diffuses and reflects light emitted to a back surface of the light guide plate for each of blocks.

16 Claims, 6 Drawing Sheets

FIG. 5A

| 1-1 (97%) | 2-1 (97%) | 3-1 (97%) |
|---|---|---|
| 1-2 (100%) | 2-2 (92%) | 3-2 (101%) |
| 1-3 (99%) | 2-3 (21%) | 3-3 (99%) |

FIG. 5B

| 1-1 (101%) | 2-1 (23%) | 3-1 (100%) |
|---|---|---|
| 1-2 (102%) | 2-2 (100%) | 3-2 (101%) |
| 1-3 (101%) | 2-3 (100%) | 3-3 (101%) |

FIG. 5C

| 1-1 (101%) | 2-1 (101%) | 3-1 (100%) |
|---|---|---|
| 1-2 (102%) | 2-2 (23%) | 3-2 (101%) |
| 1-3 (100%) | 2-3 (99%) | 3-3 (100%) |

LIQUID CRYSTAL DISPLAY DEVICE HAVING INDIVIDUALLY DRIVEN BLOCKS IN LIGHT-BLOCKING PANEL

CROSS-REFERENCE TO RELATED APPLICATIONS

The present application claims the priority benefit of Korean Patent Application No. 10-2017-0158655, filed in Republic of Korea on Nov. 24, 2017, which is hereby incorporated by reference in its entirety for all purposes as if fully set forth herein.

BACKGROUND

Field of the Invention

The present invention relates to a liquid crystal display device including a side light type backlight unit, and more particularly, to a liquid crystal display device including a backlight unit capable of realizing a scanning backlight.

Discussion of the Related Art

Recently, with the development of information technology and mobile communication technology, display devices capable of visually displaying information have been developed. A display device is broadly classified into a self-luminous display device and a non-self luminous emitting display device on which an image can be displayed through an external factor.

A non-self luminous display device can include a liquid crystal display (LCD) by way of example. Therefore, the LCD requires a separate light source. A backlight unit having a light source is provided on a back surface of the LCD to emit light toward a front surface of the LCD, and thus a visible image is realized.

The backlight unit uses a cold-cathode fluorescent lamp (CCFL), an external electrode fluorescent lamp (EEFL), a light emitting diode (LED), or the like as a light source.

Particularly, the LED among the above light sources is widely used as a display light source having characteristics of a small size, low power consumption, high reliability, and the like.

Meanwhile, a motion blurring phenomenon, in which a screen is not clear and is blurred due to the characteristics of liquid crystals, occurs when a moving picture is displayed on such an LCD.

Therefore, a scanning backlight driving technique has been proposed. In the scanning backlight driving technique, light sources of a backlight unit are sequentially blinked in a scanning direction of display lines and thus the motion blurring of the LCD is reduced.

In the scanning backlight driving technique, light emitted to a liquid crystal panel should be controllable in units of a scanning block. Therefore, positions of the light sources in the backlight unit are limited.

In this regard, a backlight unit is generally divided into a direct light type backlight unit and a side light type backlight unit according to an arrangement position of a light source. The direct light type backlight unit has a structure in which a plurality of optical sheets and a diffusing plate are stacked below a liquid crystal panel and a plurality of light sources are disposed below the diffusing plate, and thus a scanning backlight is easily realized.

On the other hand, the side light type backlight unit has a structure in which a light source is disposed to face a side surface of a light guide plate and a plurality of optical sheets are disposed between a liquid crystal panel and the light guide plate. In this case, since the light source emits light to one side of the light guide plate and the light guide plate covers the light into plane light, it is difficult to control the light emitted to the liquid crystal panel in units of a display block due to the characteristics of the light guide plate in which the light spreads in all directions, and thus a scanning backlight is not easily realized.

Since the side light type backlight unit has an advantage of being easier to manufacture than the direct light type backlight unit and has advantages of being a thin type and having a light weight and low power consumption, an LCD device which is lightweight, thin, and has a narrow bezel that has been recently required can be provided. Thus, there exists a need for a scanning backlight that can be realized even in the side light type backlight unit.

SUMMARY

Accordingly, the present invention is directed to a liquid crystal display device that substantially obviates one or more of the problems due to limitations and disadvantages of the related art.

An advantage of the present invention is to provide a liquid crystal display device including a side light type backlight unit capable of realizing a scanning backlight. Further, an advantage of the embodiments of the present invention is to provide a liquid crystal display device capable of improving moving picture realization characteristics by increasing a dynamic contrast ratio. Further, an advantage of the embodiments of the present invention is to provide a liquid crystal display device capable of realizing features of being lightweight, thin, and having a narrow bezel.

Additional features and advantages of the disclosure will be set forth in the description which follows, and in part will be apparent from the description, or may be learned by practice of the disclosure. The advantages of the disclosure will be realized and attained by the structure particularly pointed out in the written description and claims as well as the appended drawings.

To achieve these and other advantages, and in accordance with the purpose of the present invention, as embodied and broadly described herein, a liquid crystal display device includes a liquid crystal panel, an optical sheet positioned below the liquid crystal panel, a light guide plate positioned below the optical sheet, a selective light-blocking panel positioned below the light guide plate, a reflector positioned below the selective light-blocking panel, and a light emitting diode (LED) assembly positioned on a side of the light guide plate, wherein the selective light-blocking panel is sectioned into a plurality of blocks, and transmits, or diffuses and reflects light emitted to a back surface of the light guide plate for each of blocks.

It is to be understood that both the foregoing general description and the following detailed description are explanatory and are intended to provide further explanation of the embodiments as claimed.

BRIEF DESCRIPTION OF THE DRAWINGS

The accompanying drawings, which are included to provide a further understanding of the disclosure, are incorporated in and constitute a part of this specification, illustrate implementations of the disclosure and together with the description serve to explain the principles of embodiments of the disclosure. In the drawings:

FIGS. 5A to 5C are views illustrating experimental results of measuring luminance for each block of a liquid crystal display device according to an embodiment of the present invention.

DETAILED DESCRIPTION

Hereinafter, embodiments of the present invention will be described in detail with reference to the accompanying drawings.

Figure 1:
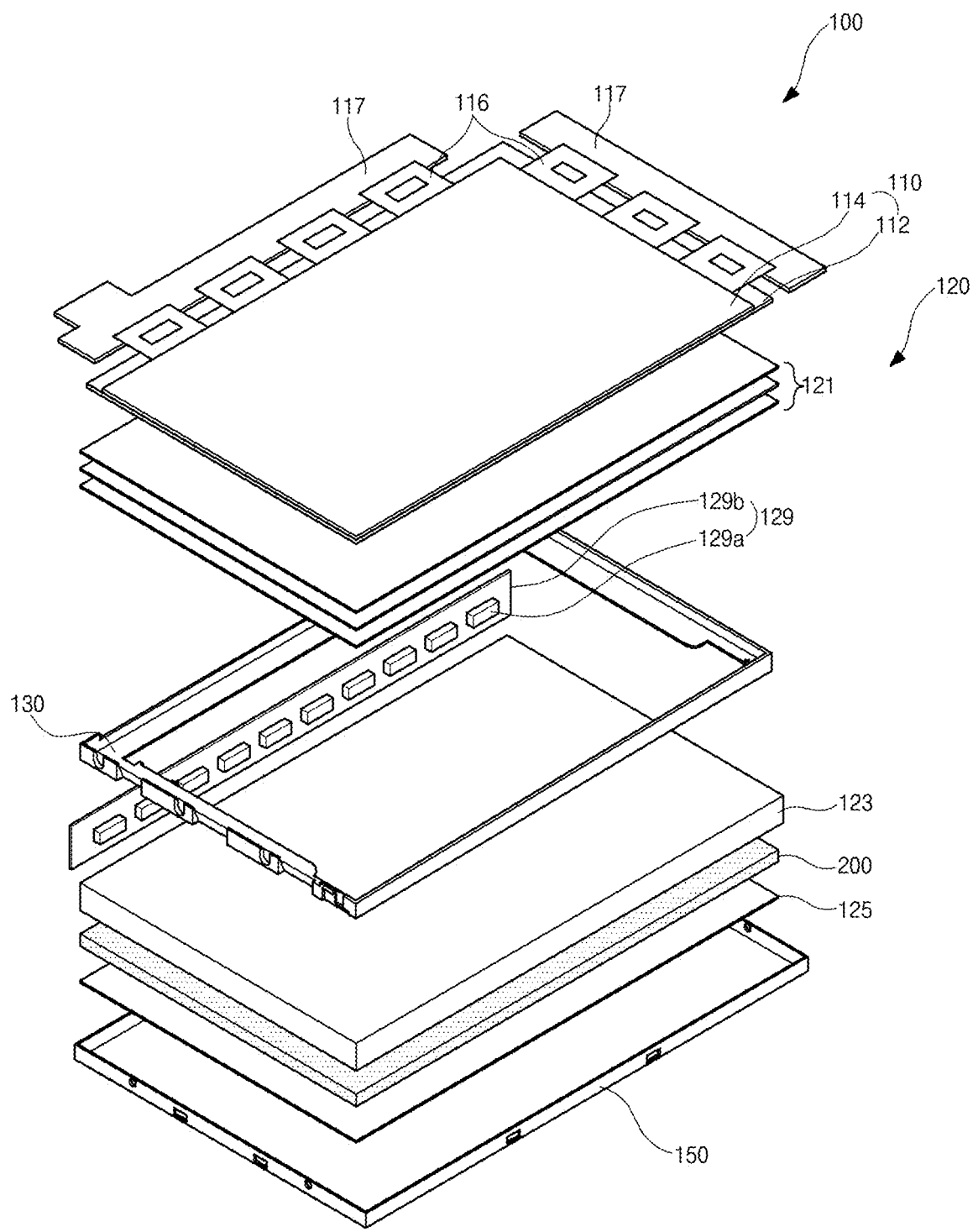
FIG. 1 is an exploded perspective view schematically illustrating a side light type liquid crystal display device according to an embodiment of the present invention.

FIG. 1 is an exploded perspective view schematically illustrating a side light type liquid crystal display device according to an embodiment of the present invention. All the components of the liquid crystal display device according to all embodiments of the present invention are operatively coupled and configured.

As shown in FIG. 1, a liquid crystal display device 100 includes a liquid crystal panel 110 and a backlight unit 120.

In more detail, the liquid crystal panel 110 is a core portion for displaying an image and includes a first substrate 112 and a second substrate 114 which face each other and are coupled with a liquid crystal layer interposed therebetween.

In case that the liquid crystal panel 110 is configured in an active matrix type, a plurality of gate lines and a plurality of data lines intersect each other on an inner surface of the first substrate 112 which is usually referred to as a lower substrate or an array substrate to define pixels. A thin film transistor (TFT) is provided at each of the intersection portions and connected in one-to-one correspondence with a transparent pixel electrode formed in each of the pixels.

A color filter, such as a red (R), green (G) or blue (B) color filter, corresponding to each of the pixels, and a black matrix, which surrounds the color filter and covers non-display elements such as the gate line, the data line, and the TFT, are provided on an inner surface of the second substrate 114 which is referred to as an upper substrate or a color filter substrate. Further, a transparent common electrode which covers the color filter and the black matrix is provided.

A polarizer which selectively transmits only a specific light is attached to an outer surface of each of the first and second substrates 112 and 114.

A printed circuit board (PCB) 117 is connected to at least one edge of the liquid crystal panel 110 through a connecting member 116 such as a flexible circuit board or a tape carrier package (TCP) and is appropriately folded to be brought into close contact with a side surface of a guide panel 130 or a back surface of a cover bottom 150 in a modularization process.

In the liquid crystal panel 110, when each gate line is selected by an on/off signal of a gate driving circuit and each TFT of the selected gate line is turned on, a signal voltage of a data driving circuit is transmitted to a corresponding pixel electrode through the data line, and an alignment direction of liquid crystal molecules is changed by an electric field generated between the pixel electrode and the common electrode, which causes a difference in transmittance.

The backlight unit 120 for supplying light on the back surface of the liquid crystal panel 110 is provided so that a difference in transmittance represented by the liquid crystal panel 110 is expressed externally. A plane light having a high luminance realized from the backlight unit 120 is provided to the liquid crystal panel 110 so that the liquid crystal panel 110 displays an image.

The backlight unit 120 includes a light emitting diode (LED) assembly 129 disposed along at least one edge of the cover bottom 150 in a longitudinal direction, a black reflector 125, a light guide plate 123 placed on the black reflector 125, and optical sheets 121 positioned above the light guide plate 123.

The LED assembly 129 is positioned on one side of the light guide plate 123 so as to face a light-incident surface of the light guide plate 123. The LED assembly 129 includes a plurality of LEDs 129a and a PCB 129b on which the plurality of LEDs 129a are mounted to be spaced a predetermined interval from each other.

The light guide plate 123 on which light emitted from the plurality of LEDs 129a is incident is formed such that, due to several instances of total reflection, the light incident from the LED 129a spreads evenly over a wide region of the light guide plate 123 while traveling in the light guide plate 123 and provides a plane light to the liquid crystal panel 110.

The black reflector 125 covers an entire back surface of the light guide plate 123.

The optical sheets 121 positioned above the light guide plate 123 can include a diffusion sheet and at least one light collecting sheet. Further, the optical sheets 121 can further include various functional sheets such as a reflection type polarizing film called a dual brightness enhancement film (DBEF), and the like.

Light guided by the light guide plate 123 is diffused or collected in a process of passing through the optical sheets 121 and processed into a high-quality plane light so that a more uniform plane light is incident on the liquid crystal panel 110.

In the liquid crystal display device 100 according to the present invention, the backlight unit 120 further includes a selective light-blocking panel (or selective type light-blocking panel) 200 between the light guide plate 123 and the black reflector 125.

Here, the selective light-blocking panel 200 operates in a blocking mode when a voltage is applied thereto and operates in a transmission mode when the voltage is not applied thereto. Accordingly, even though the liquid crystal display device 100 of the present invention includes the side light type backlight unit 120, a scanning backlight driving can be realized. This will be described below in more detail.

The liquid crystal panel 110, the LED assembly 129, the black reflector 125, the light guide plate 123, the optical sheets 121, and the selective light-blocking panel 200 are modularized using the guide panel 130 and the cover bottom 150. The cover bottom 150, which is a base for assembling an entirety of components of the liquid crystal display device 100, is formed to have a rectangular plate shape having an edge portion in which edges are bent vertically.

The guide panel 130, which is mounted on the cover bottom 150 and has a rectangular frame shape which surrounds edges of the liquid crystal panel 110, the LED assembly 129, and the light guide plate 123, is coupled to the cover bottom 150.

In this case, the guide panel 130 can be referred to as a support main, a main support, or a mold frame, and the cover bottom 150 can be referred to as a bottom cover or a lower cover.

The liquid crystal display device 100 according to the embodiment of the present invention can remove a case top and be modularized using only the guide panel 130 and the cover bottom 150 in order to realize features of being lightweight, thin, and having a narrow bezel, and thus the guide panel 130 can be made of a metal material to ensure rigidity. The guide panel 130 can be formed, for example, by extruding aluminum.

In this case, the backlight unit 120 having the above-described structure is generally referred to as a side light type backlight unit, and the LEDs 129a can be arranged in a plurality of layers on the PCB 129b according to a purpose of use. Further, a plurality of LED assemblies 129 can be provided so as to be positioned to correspond to each other along both light-incident surfaces of the light guide plate 123 that face each other.

In the above-described liquid crystal display device 100 according to the embodiment of the present invention, the selective light-blocking panel 200 is positioned between the light guide plate 123 and the black reflector 125 of the backlight unit 120, and thus a scanning backlight driving can be realized by the selective light-blocking panel 200.

In this regard, since the liquid crystal display device 100 according to the embodiment of the present invention includes the side light type backlight unit 120, a uniform plane light can be provided to the liquid crystal panel 110, and the side light type backlight unit 120 can be manufactured easier than a direct light type backlight unit having a structure in which LEDs 129a are disposed below the optical sheets 121 and also can have low power consumption with features of lightweight, thin profile and a narrow bezel.

Particularly, since a scanning backlight can be realized using the side light type backlight unit 120, a dynamic contrast ratio can be improved. Therefore, a more vivid image can be expressed.

Figure 2A:
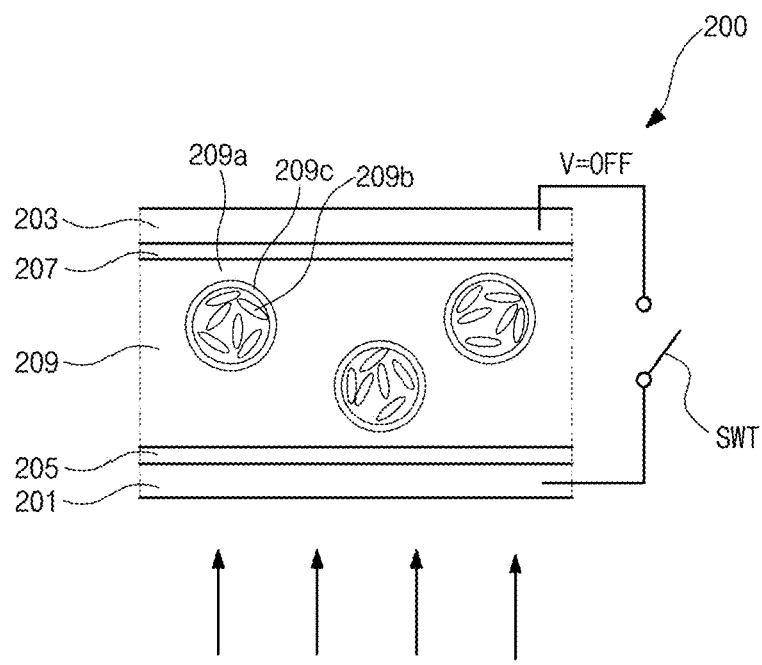
FIGS. 2A and 2B are schematic views describing characteristics in which light of a selective light-blocking panel is blocked or transmitted according to an embodiment of the present invention.
Figure 2B:
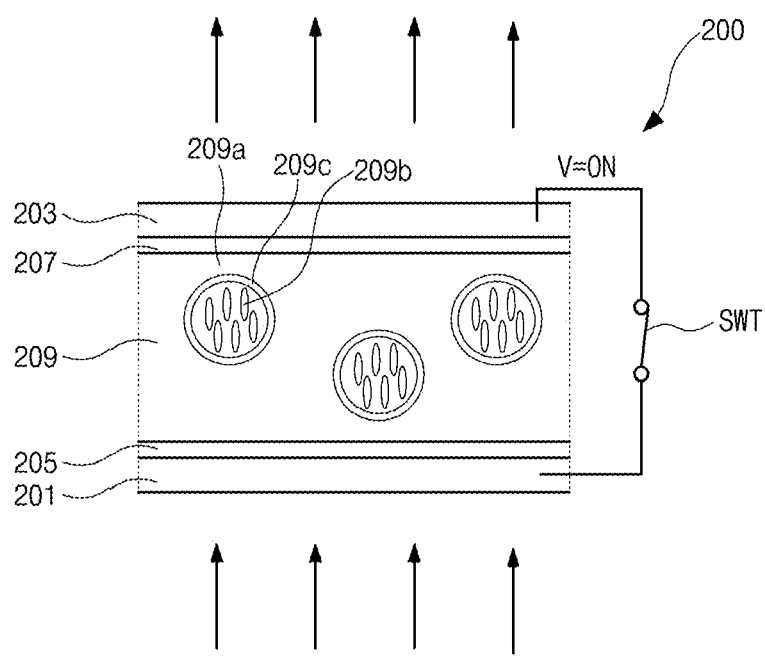

FIGS. 2A and 2B are schematic views describing characteristics in which light of a selective light-blocking panel 200 is blocked or transmitted according to an embodiment of the present invention.

As shown in FIGS. 2A and 2B, in the selective light-blocking panel 200, a polymer dispersed liquid crystal layer 209 is interposed between first and second substrates 201 and 203. First and second electrodes 205 and 207 are provided on the first and second substrates 201 and 203, respectively.

Here, the first and second substrates 201 and 203 can each be a transparent glass substrate or a plastic film. For example, the first substrate 201 and the second substrate 203 can each include a sheet or a film which includes a cellulose resin such as triacetyl cellulose (TAC) or diacetyl cellulose (DAC), a cyclo olefin polymer (COP) or cyclo olefin copolymer (COC) including a norbornene or a norbornene derivative, an acrylic resin such as poly(methylmethacrylate) (PMMA), polycarbonate (PC), polyolefin such as polyethylene (PE) or polypropylene (PP), polyvinyl alcohol (PVA), polyether sulfone (PES), polyetheretherketone (PEEK), polyetherimide (PEI), polyester such as polyethylenenaphthalate (PEN) or polyethyleneterephthalate (PET), polyimide (PI), polysulfone (PSF), a fluoride resin, or the like, but the present invention is not limited thereto.

The first and second electrodes 205 and 207 which are respectively disposed on the first and second substrates 201 and 203 can each be a transparent electrode. For example, the first and second electrodes 205 and 207 can each include indium tin oxide (ITO) or indium zinc oxide (IZO), but the present invention is not limited thereto.

The polymer dispersed liquid crystal layer 209 which is interposed between the first and second substrates 201 and 203 is formed of a mixture of liquid crystal molecules 209b and a polymer 209a. In this embodiment, the polymer dispersed liquid crystal layer 209 can be made of a polymer dispersed liquid crystal (PDLC) in which the liquid crystal molecules 209b are encapsulated by a capsule 209c and are dispersed in a matrix of the polymer 209a.

Alternatively, the polymer dispersed liquid crystal layer 209 can use a polymer network liquid crystal (PNLC), a polymer stabilized liquid crystal (PSLC), a liquid crystal stabilized polymer (LCSP), a polymer stabilized ferroelectric liquid crystal (PSFLC), or the like.

The polymer dispersed liquid crystal layer 209 includes an isotropic liquid crystal. The isotropic liquid crystal has an optically isotropic property in a three-dimensional or two-dimensional state when no voltage is applied, but has a property that birefringence occurs in a direction of an electric field when the electric field is applied.

Therefore, when a voltage is applied, the isotropic liquid crystal shows an optically uniaxial property and viewing angle dependence is caused in transmittance.

More specifically, in the polymer dispersed liquid crystal layer 209 of the present invention, the liquid crystal molecules 209b are encapsulated by the capsule 209c. The liquid crystal molecules 209b, which are irregularly aligned, and the capsule 209c have different refractive index anisotropic properties and thus light scattering occurs at an interface between the liquid crystal molecules 209b and the capsule 209c.

Therefore, when light passes through the interface, the light is scattered at the interface and enters into an opaque milky white state.

However, when a voltage is applied to the polymer dispersed liquid crystal layer 209, the liquid crystal molecules 209b, with which an inside of each capsule 209c is filled, are uniformly aligned in an electric field direction. As a result, a refractive index of the liquid crystal molecules 209b is changed. Here, refractive indexes of the capsule 209c and the liquid crystal molecules 209b are selected to match, and thus scattering does not occur at the interface between the capsule 209c and the liquid crystal molecules 209b so that the polymer dispersed liquid crystal layer 209 appears transparent.

That is, as shown in FIG. 2A, when a switching element SWT is turned off and no voltage is applied to the first electrode 205 and the second electrode 207, the liquid crystal molecules 209b of the polymer dispersed liquid crystal layer 209 are irregularly aligned in the capsule 209c in an arbitrary direction and the liquid crystal molecules 209b and the capsule 209c for encapsulating the liquid crystal molecules 209b have different refractive index anisotropic properties, and thus the liquid crystal molecules 209b and the capsule 209c have an optically isotropic property.

Therefore, light which is incident from the outside of the first substrate 201 cannot pass through the polymer dispersed liquid crystal layer 209 and is diffused and blocked.

As shown in FIG. 2B, when the switching element SWT is turned on and a voltage is applied to the first electrode 205 and the second electrode 207, the liquid crystal molecules 209b of the polymer dispersed liquid crystal layer 209 are uniformly aligned in an electric field direction and refractive indexes of the capsule 209c and the liquid crystal molecules 209b match each other, and thus the liquid crystal molecules 209b and the capsule 209c exhibit an optically isotropic property.

Therefore, the light incident from the outside of the first substrate 201 passes through the polymer dispersed liquid crystal layer 209.

Here, in the liquid crystal display device 100 (see FIG. 1) according to the embodiment of the present invention, the selective light-blocking panel 200 is positioned between the light guide plate 123 (see FIG. 1) and the black reflector 125 (see FIG. 1), and a specific region of the selective light-blocking panel 200 can absorb or block light emitted to the back surface of the light guide plate 123 (see FIG. 1) and also can make light pass through the selective light-blocking panel 200, and thus a scanning backlight can be realized.

Figure 3A:
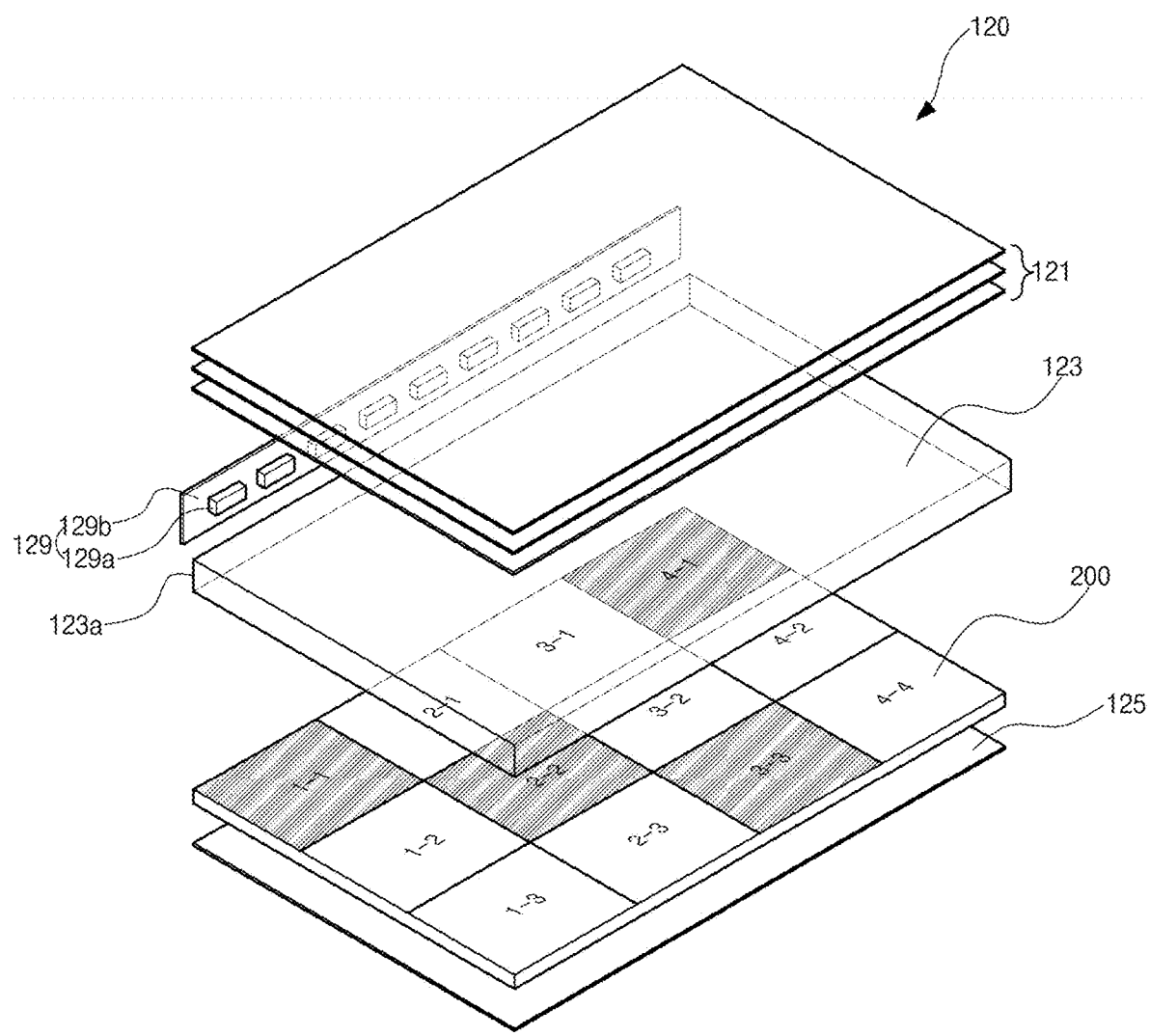
FIG. 3A is an exploded perspective view of a backlight unit of FIG. 1.

FIG. 3A is an exploded perspective view of the backlight unit of FIG. 1, and FIGS. 3B to 3D are cross-sectional views schematically showing a traveling process of light for describing scanning backlight driving of the backlight unit of FIG. 3A.

In FIGS. 3A to 3D, for convenience of description, the description and illustration of the guide panel 130 (see FIG. 1) and the cover bottom 150 (see FIG. 1) will be omitted or will be brief.

As shown in FIG. 3A, the backlight unit 120 includes a black reflector 125 mounted on the cover bottom 150 (see FIG. 1), an LED assembly 129, which is a light source disposed in a longitudinal direction of one edge of the cover bottom 150, a selective light-blocking panel 200 mounted on the black reflector 125, and a light guide plate 123 and optical sheets 121 which are sequentially positioned above the selective light-blocking panel 200.

The LED assembly 129 is positioned on one side of the light guide plate 123 facing a light-incident surface 123a of the light guide plate 123. The LED assembly 129 includes the plurality of LEDs 129a and a PCB 129b on which the plurality of LEDs 129a are mounted to be spaced a predetermined interval from each other.

In this case, the plurality of LEDs 129a can each emit light having red (R), green (G), or blue (B) color in a forward direction toward the light-incident surface 123a of the light guide plate 123. White light can be realized through color mixing by turning on the plurality of red, green, and blue LEDs 129a at once.

In order to improve luminous efficiency and luminance, an LED 129a, which includes a blue LED chip having high luminous efficiency and luminance and a yellow phosphor made of yttrium aluminum garnet (YAG: Ce) doped with cerium, can be used.

Blue light emitted from the LED chip is mixed with yellow light, which a part of the blue light is converted into by the yellow phosphor while passing through the yellow phosphor, and thus white light is realized.

Instead of the LED assembly 129, a fluorescent lamp, such as a cold cathode fluorescent lamp or an external electrode fluorescent lamp, can be used.

The light guide plate 123 on which light emitted from the plurality of LEDs 129a is incident is configured such that the light incident from the LED 129a spreads evenly over a wide region of the light guide plate 123 while traveling in the light guide plate 123 due to several instances of total reflection and provides a plane light to the liquid crystal panel 110 (see FIG. 1).

Accordingly, the light guide plate 123 is formed in a flat type using a transparent material capable of transmitting light, for example, a plastic material such as PMMA, which is an acrylic transparent resin, or a PC-based material.

The light guide plate 123 has high transparency, weather resistance, and colorability, and induces light diffusion when light passes therethrough.

A pattern is provided on a back surface of the light guide plate 123. The pattern makes light incident into the light guide plate 123 travel in the light guide plate 123 so that the light spreads evenly into the light guide plate 123 due to several instances of total reflection, and also makes some light be emitted toward the black reflector 125 positioned below the light guide plate 123.

Here, the pattern can be formed in various shapes such as an elliptical pattern, a polygonal pattern, a hologram pattern, and the like in order to guide the light incident into the light guide plate 123. The pattern is formed on the back surface of the light guide plate 123 by a printing method or an injection method.

The optical sheets 121 positioned above the light guide plate 123 include a diffusion sheet, at least one light collecting sheet, and the like. The diffusion sheet is positioned directly above the light guide plate 123 and serves to adjust a direction of the light such that light travels toward the light collecting sheet while dispersing light incident through the light guide plate 123.

The light, which passes through the diffusion sheet and is dispersed, is collected by the light collecting sheet in a direction of the liquid crystal panel 110 (see FIG. 1). Accordingly, almost all of the light which passes through the light collecting sheet travels perpendicular to the liquid crystal panel 110 (see FIG. 1).

Further, the black reflector 125 positioned below the light guide plate 123 is black and absorbs the light emitted to the back surface of the light guide plate 123. For example, the reflector 125 can include a black/dark material.

Here, in the liquid crystal display device 100 (see FIG. 1) according to the embodiment of the present invention, the selective light-blocking panel 200 is positioned between the light guide plate 123 and the black reflector 125. In this case, the selective light-blocking panel 200 is defined by being sectioned (or divided) into a plurality of blocks.

For example, the selective light-blocking panel 200 can be divided into four blocks along a long side thereof and is divided into three blocks along a short side thereof. Therefore, the selective light-blocking panel 200 can be defined by being divided into 12 (4×3) blocks.

In this case, the number of blocks, sizes of the blocks, and the like can be variously designed.

As described above, the selective light-blocking panel 200 divided into the plurality of blocks can be individually driven for each block. That is, one electrode of the first and second electrodes 205 and 207 (see FIG. 2B) which are respectively provided on the first and second substrates 201 and 203 (see FIG. 2B) of the selective light-blocking panel 200 is provided by being divided into a plurality of blocks so that the selective light-blocking panel 200 can be individually driven for each block.

For example, when the first electrode 205 (see FIG. 2B) is provided by being divided into a plurality of blocks, a voltage is applied to only a portion of the first electrode 205 (see FIG. 2B) positioned on a block 1-1 of the selective light-blocking panel 200 and no voltage is applied to portions of the first electrode 205 (see FIG. 2B) positioned on the other blocks, and thus the selective light-blocking panel 200 individually drives only the block 1-1 so that light can pass through only the block 1-1.

As described above, the selective light-blocking panel 200 can be defined by being divided into a plurality of blocks and can individually drive each block. Accordingly, a uniform plane light can be provided to an entire surface of the liquid crystal panel 110 (see FIG. 1) or light can be provided to only a desired region of the liquid crystal panel 110 (see FIG. 1).

For example, even though the liquid crystal display device 100 (see FIG. 1) according to the embodiment of the present invention includes the side light type backlight unit 120, a scanning backlight can be realized.

More specifically, the light emitted from the LED 129a is incident into the light guide plate 123 through the light-incident surface 123a of the light guide plate 123 so that the light spreads evenly on the entire region of the light guide plate 123 due to several instances of total reflection, and is also emitted to the back surface of the light guide plate 123 by a pattern provided on the back surface of the light guide plate 123.

Figure 3B:
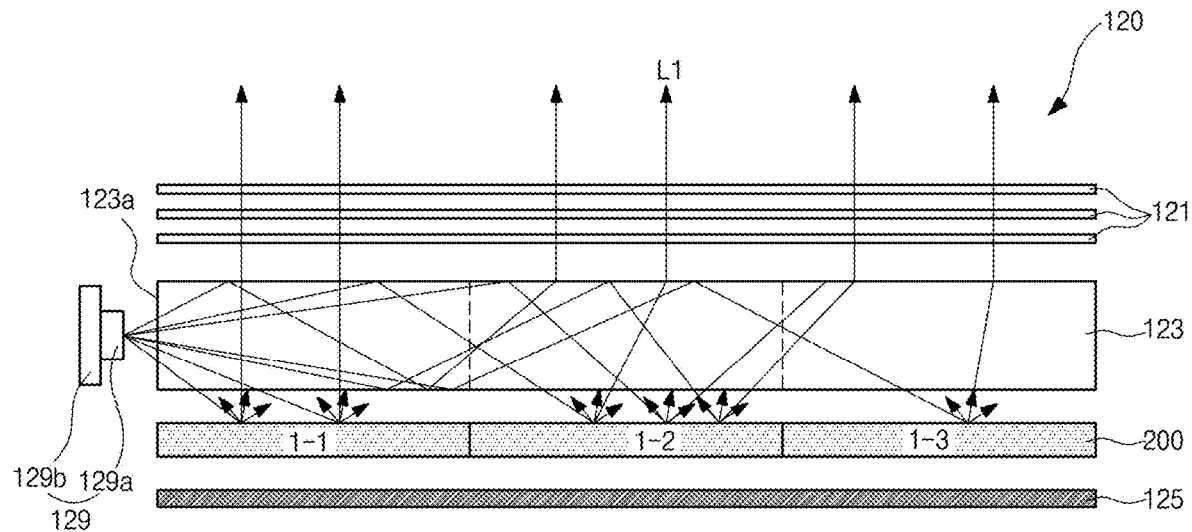
FIGS. 3B to 3D are cross-sectional views schematically showing a traveling process of light for describing scanning backlight driving of the backlight unit of FIG. 3A.

In this case, as shown in FIG. 3B, the polymer dispersed liquid crystal layer 209 (see FIG. 2B) of all the blocks of the selective light-blocking panel 200 is not driven so that the selective light-blocking panel 200 is maintained in an opaque state.

Therefore, the light emitted to the back surface of the light guide plate 123 is diffused and reflected by the selective light-blocking panel and is emitted toward the front of the light guide plate.

A first light L1 emitted toward the front of the light guide plate 123 is processed into a high-quality plane light and provided to the liquid crystal panel 110 (see FIG. 1) in a process of passing through the optical sheets 121.

Figure 3C:
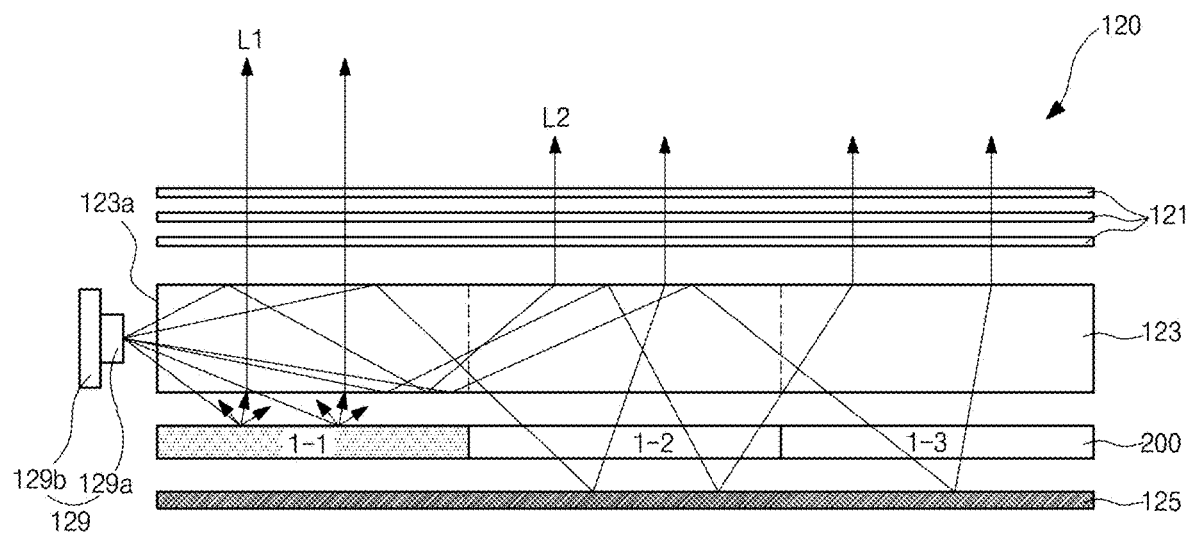

As shown in FIG. 3C, when only a block 1-2 and a block 1-3 of the selective light-blocking panel 200 are driven and the block 1-1 is not driven, light which travels to the block 1-1 of the selective light-blocking panel 200 among the light emitted to the back surface of the light guide plate 123 is diffused and reflected by the selective light-blocking panel 200 and is emitted toward the front of the light guide plate as the first light L1, and light which travels to the block 1-2 and the block 1-3 of the selective light-blocking panel 200 passes through the selective light-blocking panel 200 to travel to the black reflector 125 and is absorbed by the black reflector.

The first light L1 emitted toward the front of the light guide plate 123 is provided to only a specific region of the liquid crystal panel 110 (see FIG. 1) corresponding to the block 1-1 of the selective light-blocking panel 200. Only a smaller amount of a second light L2 than that of the first light L1 emitted toward the front of the light guide plate 123 corresponding to the block 1-1 of the selective light-blocking panel 200 is emitted toward the front of the light guide plate 123 corresponding to the block 1-2 and the block 1-3 of the selective light-blocking panel 200.

Figure 3D:
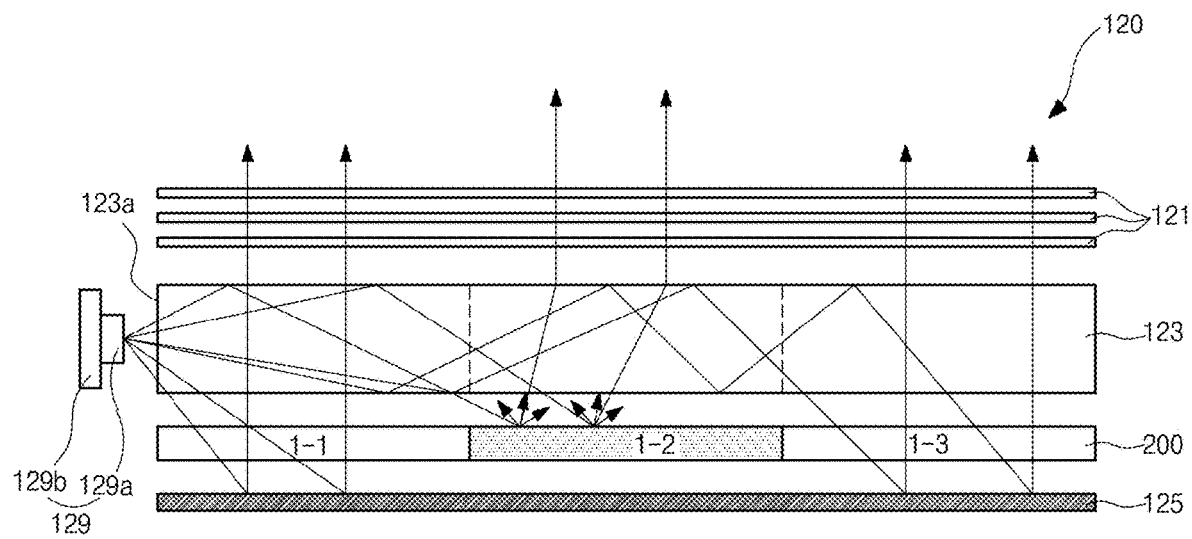

Further, as shown in FIG. 3D, when only the block 1-1 and the block 1-3 of the selective light-blocking panel 200 are driven and the block 1-2 is not driven, light which travels to the block 1-2 of the selective light-blocking panel 200 among the light emitted to the back surface of the light guide plate 123 is diffused and reflected by the selective light-blocking panel 200, and light which travels to the block 1-1 and the block 1-3 of the selective light-blocking panel 200 passes through the selective light-blocking panel 200 to travel to the black reflector 125.

Therefore, the first light L1 is emitted only toward the front of the light guide plate 123 corresponding to the block 1-2 of the selective light-blocking panel 200, and the second light L2 weaker than the first light L1 is emitted toward the front of the light guide plate 123 corresponding to the block 1-1 and the block 1-3 of the selective light-blocking panel 200.

In this manner, in the liquid crystal display device 100 (see FIG. 1) according to the embodiment of the present invention, a bright image is made brighter and a dark image is made darker in an image realized in the liquid crystal panel 110 (see FIG. 1) so that a dynamic contrast ratio can be improved and a more vivid image can be realized.

For example, in the liquid crystal display device 100 (see FIG. 1) according to the embodiment of the present invention, the selective light-blocking panel 200 is positioned between the light guide plate 123 and the black reflector 125 and then the selective light-blocking panel 200 is individually driven for each block, and thus a uniform plane light can be provided to the entire surface of the liquid crystal panel 110 (see FIG. 1) or light can be provided to only a desired region of the liquid crystal panel 110 (see FIG. 1).

Therefore, since the liquid crystal display device 100 according to the embodiment of the present invention uses the side light type backlight unit 120, a uniform plane light can be provided to the liquid crystal panel 110, and the side light type backlight unit 120 can be manufactured easier than a direct light type backlight unit having a structure in which LEDs 129a are disposed below the optical sheets 121 and also can have low power consumption with features of lightweight, thin profile and a narrow bezel.

Particularly, since a scanning backlight can be realized using the side light type backlight unit 120, a dynamic contrast ratio can be improved and a more vivid image can be expressed.

Figure 4:
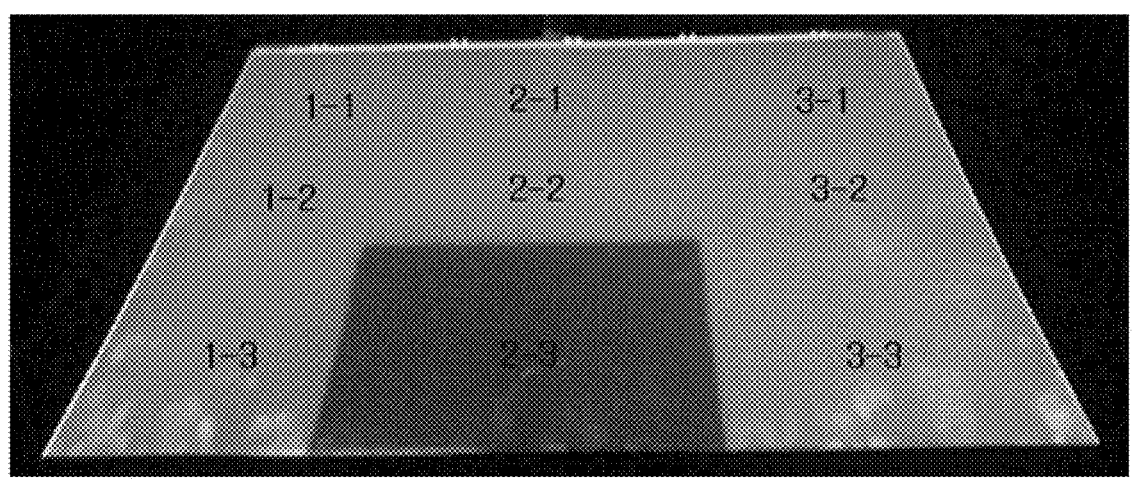
FIG. 4 is a view illustrating an experimental result of a state in which a portion of a selective light-blocking panel of a backlight unit is driven according to an embodiment of the present invention.

FIG. 4 is a view illustrating an experimental result of a state in which a portion of the selective light-blocking panel of the backlight unit is driven according to the embodiment of the present invention, and FIGS. 5A to 5C are view illustrating experimental results of measuring luminance for each block of the liquid crystal display device according to the embodiment of the present invention.

Here, in the experiment, the selective light-blocking panel 200 was defined by dividing a long side and a short side thereof into three blocks each, which was divided into 9 (3×3) blocks, and luminance was measured at an arbitrary point corresponding to each block.

As shown in FIG. 4, in the liquid crystal display device 100 (see FIG. 1) according to the embodiment of the present invention, the selective light-blocking panel 200 (see FIG. 3D) is positioned between the light guide plate 123 (see FIG. 3D) and the black reflector 125 (see FIG. 3D) of the backlight unit 120 (see FIG. 3D), and the selective light-blocking panel 200 (see FIG. 3D) is driven for each block so that light can be transmitted or blocked.

Here, when a block 2-3 of the selective light-blocking panel 200 (see FIG. 3D) is driven, almost all the light emitted to the back surface of the light guide plate 123 (see FIG. 3D) among the light, which is emitted from the plurality of LEDs 129a (see FIG. 3D) of the LED assembly 129 (see FIG. 3D) and incident into the light guide plate 123 (see FIG. 3D), is diffused and reflected by blocks other than the block 2-3 of the selective light-blocking panel 200 (see FIG. 3D) and is emitted toward the front of the light guide plate 123 (see FIG. 3D). On the other hand, the light emitted to the back surface of the light guide plate 123 (see FIG. 3D) corresponding to the block 2-3 of the selective light-blocking panel 200 (see FIG. 3D) passes through the selective light-blocking panel 200 (see FIG. 3D) and is absorbed by the black reflector 125 (see FIG. 3D).

Therefore, since the light is not emitted toward the front of the light guide plate 123 (see FIG. 3D) corresponding to the block 2-3 of the selective light-blocking panel 200 (see FIG. 3D), only a region corresponding to the block 2-3 of the selective light-blocking panel 200 (see FIG. 3D) is measured with a lower luminance than the other regions.

Here, referring to FIG. 5A, when only the block 2-3 of the selective light-blocking panel 200 (see FIG. 3D) is driven, a luminance of only 23% compared with a luminance of the liquid crystal display device 100 (see FIG. 1), which is realized to be opaque when all of the blocks of the selective light-blocking panel 200 (see FIG. 3D) are not driven, is measured in the region corresponding to the block 2-3 of the selective light-blocking panel 200 (see FIG. 3D).

Further, referring to FIG. 5B, it can be seen that luminance of a block 2-1 is lower than that of the other blocks. In this case, the selective light-blocking panel 200 (see FIG. 3D) is driven only in the block 2-1 and is not driven in all the blocks excluding the block 2-1.

Therefore, since the block 2-1 of the selective light-blocking panel 200 (see FIG. 3D) is maintained in a transparent state and the remaining blocks other than the block 2-1 are maintained in an opaque state, almost all of the light emitted to the back surface of the light guide plate 123 (see FIG. 3D) among the light incident into the light guide plate 123 (see FIG. 3D) is diffused and reflected by the remaining blocks excluding the block 2-1 of the selective light-blocking panel 200 (see FIG. 3D and is emitted toward the front of the light guide plate 123 (see FIG. 3D). On the other hand, the light emitted to the back surface of the light guide plate 123 (see FIG. 3D) corresponding to the block 2-1 of the selective light-blocking panel 200 (see FIG. 3D) passes through the selective light-blocking panel 200 (see FIG. 3D) and is absorbed into the black reflector 125 (see FIG. 3D), and thus no light was emitted toward the front of the light guide plate 123 (see FIG. 3D).

Therefore, only a region corresponding to the block 2-1 of the selective light-blocking panel 200 (see FIG. 3D) is measured with a lower luminance than the other regions.

Referring to FIG. 5C, a block 2-2 of the selective light-blocking panel 200 (see FIG. 3D) is driven. Therefore, only a region corresponding to the block 2-2 of the selective light-blocking panel 200 (see FIG. 3D) is measured with a lower luminance than the other regions.

As described above, in the liquid crystal display device 100 (see FIG. 1) according to the embodiment of the present invention, the selective light-blocking panel 200 (see FIG. 3D) is positioned between the light guide plate 123 (see FIG. 3D) and the black reflector 125 (see FIG. 3D) of the backlight unit 120 (see FIG. 3D). Accordingly, a uniform plane light can be provided to the liquid crystal panel 110 (see FIG. 1), and the side light type backlight unit 120 (see FIG. 3D) can be manufactured easier than a direct light type backlight unit having a structure in which LEDs 129a (see FIG. 3D) are disposed below the optical sheets 121 (see FIG. 3D) and also can have low power consumption with features of lightweight, thin profile and a narrow bezel.

Particularly, since a scanning backlight can be realized using the side light type backlight unit 120 (see FIG. 3D), a dynamic contrast ratio can be improved and a more vivid image can be expressed.

Meanwhile, an effect of the selective light-blocking panel 200 (see FIG. 3D) depends on a position of the selective light-blocking panel 200 (see FIG. 3D) in the side light type backlight unit 120 (see FIG. 3D) and a type of the reflector 125 (see FIG. 3D). This is described in detail with reference to the following Table 1.

TABLE 1

|  | Luminance Ratio (%) |
| --- | --- |
| Sample A | 103.0% |
| Sample B | 92.0% |
| Sample C | 106.5% |
| Sample D | 40.2% |

Sample A has a configuration in which a selective light-blocking panel is positioned between a light guide plate and an optical sheet of a side light type backlight unit and a reflector is a white or different color. Sample B has a configuration in which a selective light-blocking panel is positioned between a light guide plate and a reflector of a side light type backlight unit and the reflector is a white or different color.

Sample C has a configuration in which a selective light-blocking panel is positioned between a light guide plate and an optical sheet of a side light type backlight unit and a reflector is black. Sample D is the configuration of the side light type backlight unit 120 (see FIG. 3D) according to the embodiment of the present invention, and has a configuration in which the selective light-blocking panel 200 (see FIG. 3D) is positioned between the light guide plate 123 (see FIG. 3D) and the reflector 125 (see FIG. 3D) and the reflector 125 (see FIG. 3D) is black.

A luminance ratio is expressed as a ratio of luminance difference which is changed when the luminance of the liquid crystal display device, in which the selective light-blocking panel 200 (see FIG. 3D) is not positioned, is 100%.

Referring to the above Table 1, in Sample A and Sample C, when the selective light-blocking panel is positioned between the light guide plate and the optical sheet, it can be seen that the luminance is hardly adjusted by the selective light-blocking panel.

Further, even when the selective light-blocking panel in Sample B is positioned between the light guide plate and the reflector, it can be seen that the luminance is hardly adjusted by the selective light-blocking panel even when the reflector is a white or different color.

On the other hand, referring to Sample D, the selective light-blocking panel 200 (see FIG. 3D) is positioned between the light guide plate 123 (see FIG. 3D) and the reflector 125 (see FIG. 3D) and the reflector 125 (see FIG. 3D) is black, and thus it can be seen that the luminance is lowered by about 60%. This means that, in Sample D, the luminance can be adjusted by the selective light-blocking panel 200 (see FIG. 3D).

That is, in the liquid crystal display device 100 (see FIG. 1) according to the embodiment of the present invention, the selective light-blocking panel 200 (see FIG. 3D) is positioned between the light guide plate 123 (see FIG. 3D) and the black reflector 125 (see FIG. 3D) of the backlight unit 120 (see FIG. 3D) and a specific region of the selective light-blocking panel 200 (see FIG. 3D) can absorb and block light emitted to the back surface of the light guide plate 123 (see FIG. 3D) and can also make the light pass through the selective light-blocking panel 200 (see FIG. 3D), and thus a scanning backlight can be realized. A bright image is made brighter and a dark image is made darker in an image realized in the liquid crystal panel 110 (see FIG. 1) so that a dynamic contrast ratio can be improved and a more vivid image can be realized.

As described above, according to the embodiments of the present invention, a selective light-blocking panel is positioned between a light guide plate and a black reflector of a backlight unit. Accordingly, a uniform plane light can be provided to the liquid crystal panel, and the side light type backlight unit can be manufactured easier than a direct light type backlight unit having a structure in which LEDs are disposed below the optical sheets and also can have low power consumption with features of lightweight, thin profile and a narrow bezel.

Particularly, since a scanning backlight can be realized using the side light type backlight unit according to the embodiments of the present invention, a dynamic contrast ratio can be improved and a more vivid image can be expressed.

It will be apparent to those skilled in the art that various modifications and variations can be made in a display device of the present invention without departing from the sprit or scope of the disclosure. Thus, it is intended that the present invention covers the modifications and variations of this disclosure provided they come within the scope of the appended claims and their equivalents.

What is claimed is:

1. A liquid crystal display device comprising:
   a liquid crystal panel;
   an optical sheet positioned below the liquid crystal panel;
   a light guide plate positioned below the optical sheet;
   a selective light-blocking panel positioned below the light guide plate;
   a black reflector positioned below the selective light-blocking panel, and being black and configured to absorb light that is emitted through a back surface of the light guide plate and then is transmitted through the selective light-blocking panel; and
   a light emitting diode (LED) assembly positioned on a side of the light guide plate, and configured to emit the light,
   wherein the selective light-blocking panel is sectioned into a plurality of blocks that are individually driven, and each block is configured to transmit the light emitted through the back surface of the light guide plate when turned on, and configured to diffuse and reflect the light emitted through the back surface of the light guide plate when turned off,
   wherein a luminance of the light that is emitted towards a front of the light guide plate after being transmitted through a block that is turned on among the plurality of blocks and being reflected by the black reflector is lower than a luminance of the light that is emitted towards the front of the light guide plate after being diffused and reflected by a block that is turned off among the plurality of blocks based on the black reflector being configured to absorb the light that is transmitted through the block that is turned on,
   wherein the entire black reflector includes a black material,
   wherein the selective light-blocking panel includes a first substrate and a second substrate, which have a first electrode and a second electrode, respectively, and a polymer dispersed liquid crystal layer interposed between the first and second substrates,
   wherein the polymer dispersed liquid crystal layer includes liquid crystal olecules which are encapsulated by a capsule and dispersed in a matrix of polymer,
   wherein refractive indexes of the capsule and the liquid crystal molecules match each other, and
   wherein the selectivelight-blocking panel is located apart from the light guide plate.

2. The liquid crystal display device of claim 1, wherein the first electrode and the second electrode are transparent electrodes, and the first substrate and the second substrate are transparent substrates.

3. The liquid crystal display device of claim 1, wherein the polymer dispersed liquid crystal layer includes an isotropic liquid crystal.

4. The liquid crystal display device of claim 1, wherein one electrode of the first and second electrodes is divided into the blocks.

5. The liquid crystal display device of claim 1, wherein the polymer dispersed liquid crystal layer becomes transparent when a voltage is applied to the first and second electrodes so that a corresponding block is turned on, and
   wherein the polymer dispersed liquid crystal layer becomes opaque when a voltage is not applied to the first and second electrodes so that the corresponding block is turned off.

6. The liquid crystal display device of claim 1, wherein the selective light-blocking panel includes a polymer dispersed liquid crystal (PCLC), a polymer network liquid crystal (PNLC), a polymer stabilized liquid crystal (PSLC), a liquid crystal stabilized polymer (LCSP), or a polymer stabilized ferroelectric liquid crystal (PSFLC).

7. The liquid crystal display device of claim 1, wherein the luminance of the light is adjusted so that a bright image is made brighter and a dark image is made darker, whereby a dynamic contrast ratio is improved and a vivid image is realized.

8. The liquid crystal display device of claim 1, wherein the luminance of the light that is that is emitted towards the front of the light guide plate after being transmitted through the block that is turned on is about 60% or more lower compared to the luminance of the light that is emitted towards the front of the light guide plate after being diffused and reflected by the block that is turned off.

9. The liquid crystal display device of claim 1, wherein the black reflector only absorbs the light that is transmitted through the block that is turned on.

10. A liquid crystal display device comprising:
    a liquid crystal panel;
    an optical sheet below the liquid crystal panel;
    a light guide plate below the optical sheet;
    a selective light-blocking panel below the light guide plate;
    a light emitting diode (LED) assembly positioned on a side of the light guide plate, and configured to emit light; and
    a black reflector below the selective light-blocking panel, and being black and configured to absorb the light that is emitted through a back surface of the light guide plate and then is transmitted through the selective light-blocking pane,
    wherein the selective light-blocking panel includes a plurality of blocks that are individually driven, and each block configured to transmit the light emitted through the back surface of the light guide plate when turned on, and configured to diffuse and reflect the light emitted through the back surface of the light guide plate when turned off,
    wherein a luminance of the light that is that is emitted towards a front of the light guide plate after being transmitted through a block that is turned on among the plurality of blocks and being reflected by the black reflector is lower than a luminance of the light that is emitted towards the front of the light guide plate after being diffused and reflected by a block that is turned off among the plurality of blocks based on the black reflector being configured to absorb the light that is transmitted through the block that is turned on, and wherein the selective light-blocking panel is located apart from the light guide plate.

11. The liquid crystal display device of claim 10, wherein the entire black reflector includes a black material that absorbs the transmitted light.

12. The liquid crystal display device of claim 10, wherein the black reflector covers the entire back surface of the light guide plate.

13. The liquid crystal display device of claim 10, wherein the selective light-blocking panel includes a first substrate and a second substrate, which have a first electrode and a second electrode, respectively, and a polymer dispersed liquid crystal layer interposed between the first and second substrates.

14. The liquid crystal display device of claim 13, wherein the polymer dispersed liquid crystal layer includes liquid crystal molecules which are encapsulated by a capsule and dispersed in a matrix of polymer, and wherein refractive indexes of the capsule and the liquid crystal molecules are same.

15. The liquid crystal display device of claim 10, wherein the luminance of the light that is that is emitted towards the front of the light guide plate after being transmitted through the block that is turned on is about 60% or more lower compared to the luminance of the light that is emitted towards the front of the light guide plate after being diffused and reflected by the block that is turned off.

16. The liquid crystal display device of claim 10, wherein the black reflector only absorbs the light that is transmitted through the block that is turned on.

* * * * *